United States Patent [19]

Taillie

[11] Patent Number: 5,274,522
[45] Date of Patent: Dec. 28, 1993

[54] MAGNETIC HEAD-TO-MEDIA BACKER DEVICE

[75] Inventor: Paul L. Taillie, Rochester, N.Y.

[73] Assignee: Eastman Kodak Company, Rochester, N.Y.

[21] Appl. No.: 835,884

[22] Filed: Feb. 14, 1992

[51] Int. Cl.⁵ .............................................. G11B 15/62
[52] U.S. Cl. ............................ 360/130.3; 360/130.32; 360/132
[58] Field of Search ........... 360/130.3, 130.31, 130.32, 360/130.33, 130.34, 132; 242/199

[56] References Cited

U.S. PATENT DOCUMENTS

| | | | |
|---|---|---|---|
| 3,648,941 | 3/1972 | Merry | 360/130.33 |
| 4,161,758 | 7/1979 | Wray | 360/90 |
| 4,370,035 | 1/1983 | Stella | 352/78 R |
| 4,669,020 | 5/1987 | Shepherd et al. | 360/130.32 |
| 4,747,007 | 5/1988 | Ikebe et al. | 360/132 |
| 4,780,782 | 10/1988 | Bordignon | 360/130.31 |
| 4,858,043 | 8/1989 | Kadokura et al. | 360/99.01 |

FOREIGN PATENT DOCUMENTS 1152031  4/1985  U.S.S.R. .

OTHER PUBLICATIONS

IBM/TDB vol. 6, No. 9, Feb. 1964, pp. 57-58 "Pressure Pad for Magnetic Heads" by Bond.

Primary Examiner—John H. Wolff
Attorney, Agent, or Firm—Roger A. Fields

[57] ABSTRACT

A magnetic head-to-media backer device comprising an elastically deformable reed-like backer member adapted to urge a flexible magnetic media into contact with a magnetic head, is characterized in that a rigid frame has a cavity defined at least by a pair of opposite walls shaped to hold the backer member bent in an arc with two opposite leg portions of the backer member captured within the cavity to permit them to be deformed against respective ones of the opposite walls and a center portion of the backer member protruding from an opening to the cavity to permit it to be depressed at least part way into the opening to deform the leg portions toward the opposite walls. Thus, when a magnetic head is forced against the center portion the center portion can be depressed into the opening until the leg portions are deformed against the opposite walls, thereby providing a very stable support for the magnetic head.

6 Claims, 3 Drawing Sheets

MAGNETIC HEAD-TO-MEDIA BACKER DEVICE

BACKGROUND OF THE INVENTION

1. Field of the Invention

The invention relates generally to the field of magnetic recording and/or playback apparatus, and specifically to magnetic head-to-media backer devices.

2. Description of the Prior Art

It is well known in magnetic recording (write) and/or playback (read) apparatus to include a leaf spring positioned to urge a flexible magnetic media, such as a magnetic tape, into contact with a magnetic write and/or read head. For example, in U.S. Pat. No. 4,780,782, issued Oct. 25, 1988, a leaf spring has opposite end portions folded about respective fixed pegs in a tape cassette. When a magnetic head is inserted into the cassette to press the magnetic tape against the head, the leaf spring is deformed or depressed at a center portion by the force of the head. However, owing to the arrangement of the leaf spring on the pegs, the leaf spring may shift laterally during movement of the tape between the head and the spring, thereby adversely affecting the head-to-tape write and/or read relationship.

SUMMARY OF THE INVENTION

According to the invention, a magnetic head-to-media backer device comprising an elastically deformable reed-like backer member adapted to urge a flexible magnetic media into contact with a magnetic head, is characterized in that a rigid frame has a cavity defined at least by a pair of opposite walls shaped to hold the backer member bent in an arc with two opposite leg portions of the backer member captured within the cavity to permit them to be deformed against respective ones of the opposite walls and a center portion of the backer member protruding from an opening to the cavity to permit it to be depressed at least part way into the opening to deform the leg portions toward the opposite walls. Thus, when a magnetic head is forced against the center portion the center portion can be depressed into the opening until the leg portions are deformed against the opposite walls, thereby providing a very stable support for the magnetic head.

DETAILED DESCRIPTION OF THE PREFERRED EMBODIMENT

Figure 1:
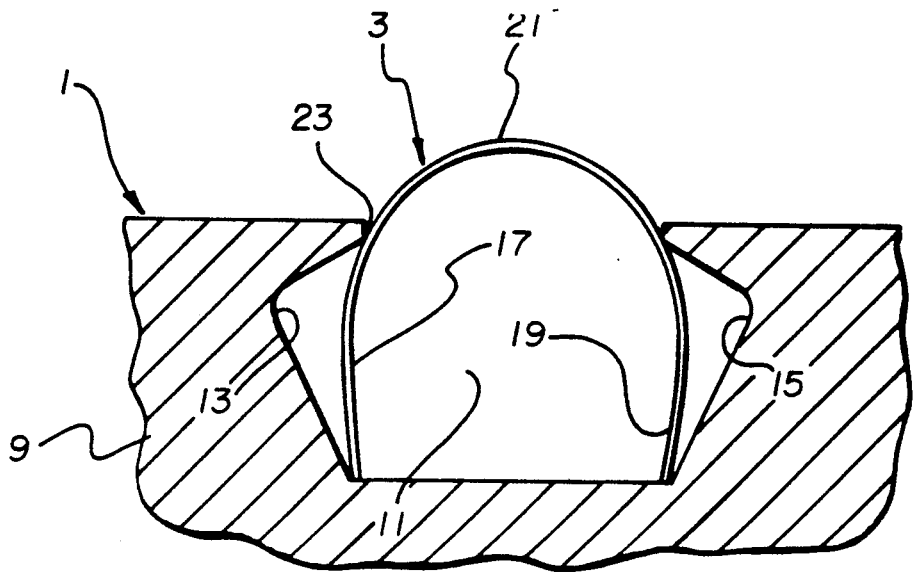
FIG. 1 is an elevation view partly in section of a magnetic head-to-media backer device according to a preferred embodiment of the invention, showing a spring-like backer member in a relaxed normal state.
Figure 2:
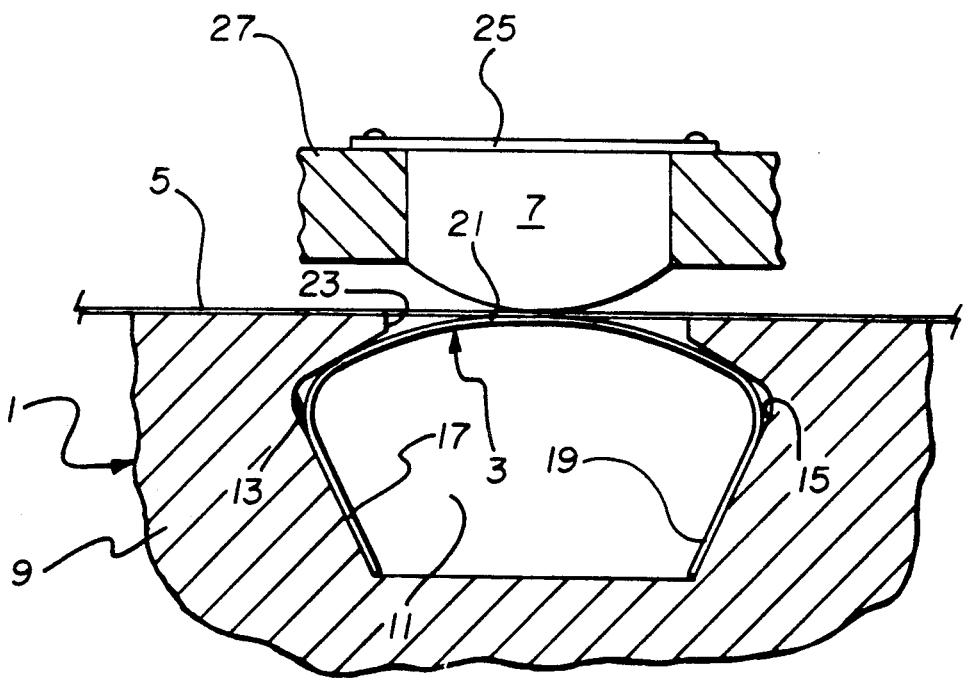
FIG. 2 is an elevation view similar to FIG. 1, showing the backer member in a deformed working state in which it urges a magnetic media into contact with a magnetic head.

Referring the drawings and in particular to FIGS. 1 and 2, a magnetic head-to-media backer device 1 comprising an elastically deformable reed-like backer member 3 adapted to urge a flexible magnetic media 5 into contact with a magnetic head 7 is shown. The magnetic media 5 may be a conventional magnetic tape or it may be a photographic film having a virtually transparent magnetic coating covering the non-emulsion side of the film as described in U.S. Pat. No. 4,996,546 issued Feb. 26, 1991.

According to the invention, the backer device 1 includes a rigid frame 9 which may be part of a tape or film cassette as in U.S. Pat. No. 4,780,782, issued Oct. 25, 1988, or part of a magnetic recording and/or playback apparatus as in U.S. Pat. No. 3,984,049, issued Oct. 5, 1976, or part of a photographic camera as in U.S. Pat. No. 4,996,546, issued Feb. 26, 1991. The rigid frame 9 has a cavity 11 defined at least by a pair of opposite walls 13 and 15 shaped to hold the backer member 3 bent in an arc with two opposite leg portions 17 and 19 of the backer member captured within the cavity to permit them to be deformed away from each other until they are constrained against the opposite walls and a center portion 21 of the backer member protruding from an opening 23 to the cavity to permit it to be depressed at least part way into the opening to deform the leg portions substantially against the opposite walls. See FIGS. 1 and 2. Thus, when the magnetic head 7 is forced against the center portion 21 as shown in FIG. 2, the center portion is depressed into the opening 23 at least until the leg portions 17 and 19 are deformed against the opposite walls 13 and 15. For the purpose of illustration, the magnetic head 7 is depicted supported by a bracket 25 secured to a movable platen 27 as in U.S. Pat. No. 4,996,546.

Preferably, the opposite walls 13 and 15 of the cavity 11 are concave-shaped in opposing directions in order to guide the leg portions 17 and 19 of the backer member 3 away from each other until they substantially conform with the respective concavities as shown in FIG. 2, when the center portion of the backer member is depressed into the opening 23 to the cavity. Also, the opposite walls 13 and 15 are normally spaced from respective ones of the leg portions 17 and 19 to provide room for the leg portions to be deformed sufficiently within the cavity 11 to allow the center portion 21 to be depressed substantially to the opening 23 as shown in FIG. 2.

THE FIRST ALTERNATE EMBODIMENT

Figure 3:
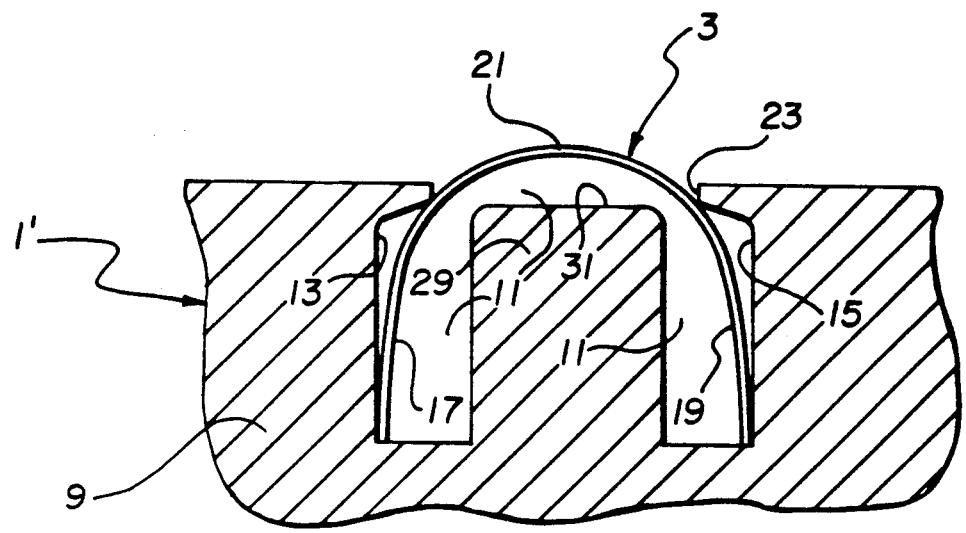
FIG. 3 is an elevation view similar to FIG. 1 but of a first alternate embodiment of the invention, showing the backer member in the relaxed normal state.
Figure 4:
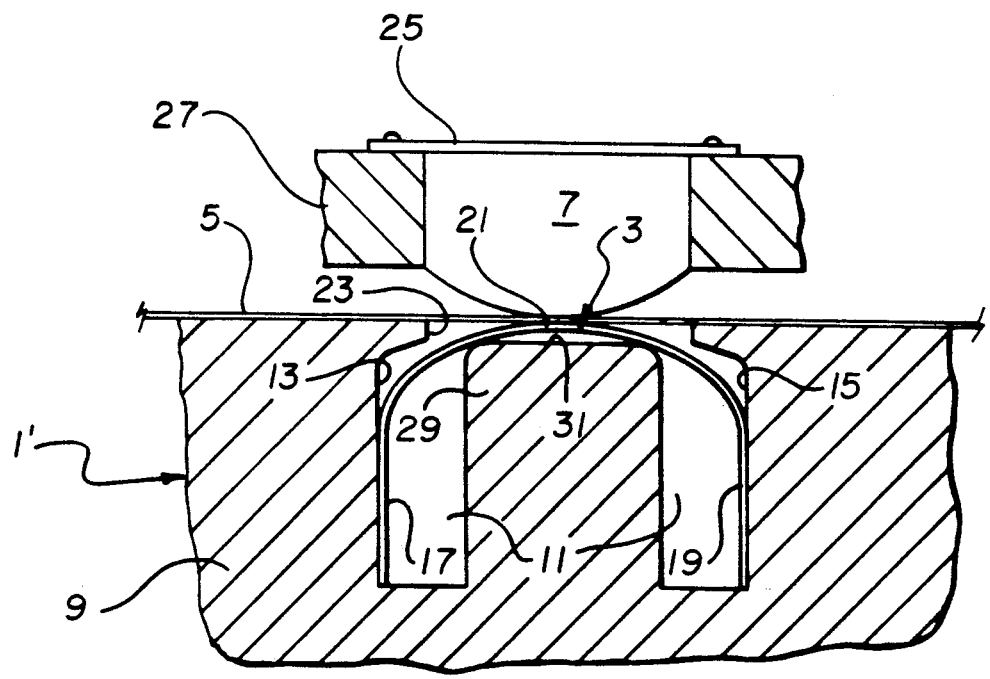
FIG. 4 is an elevation view similar to FIG. 2 but of the first alternate embodiment of the invention, showing the backer member in the deformed working state.

FIG. 3 shows a first alternate backer device 1' in the same state as the preferred backer device 1 is shown in FIG. 1, and FIG. 4 shows the first alternate backer device in the same state as the preferred backer device is shown in FIG. 2. In FIGS. 3 and 4, the reference numbers 3, 5, 7, 9, 11, 13, 15, 17, 19, 21, 23, 25, and 27 indicate elements corresponding to those shown in FIGS. 1 and 2 with like numbers. In addition, the rigid frame 9 includes a support 29 for the center portion 21 of the backer member 3 which stands erect in the cavity 11 between the leg portions 17 and 19 of the backer member and beneath the center portion. Preferably, the support 29 has a flat top surface 31 facing the center portion 21. See FIG. 3. When the magnetic head 7 is forced against the center portion 21 as shown in FIG. 4, the center portion is depressed into the opening 23 to the cavity 11 and partially against the flat surface 31.

THE SECOND ALTERNATE EMBODIMENT

Figure 5:
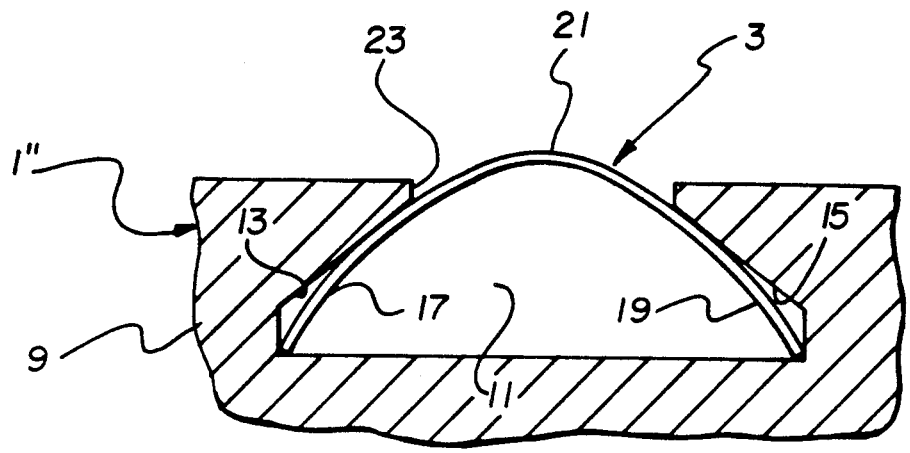
FIG. 5 is an elevation view similar to FIG. 1 but of a second alternate embodiment of the invention, showing the backer member in the relaxed normal state.
Figure 6:
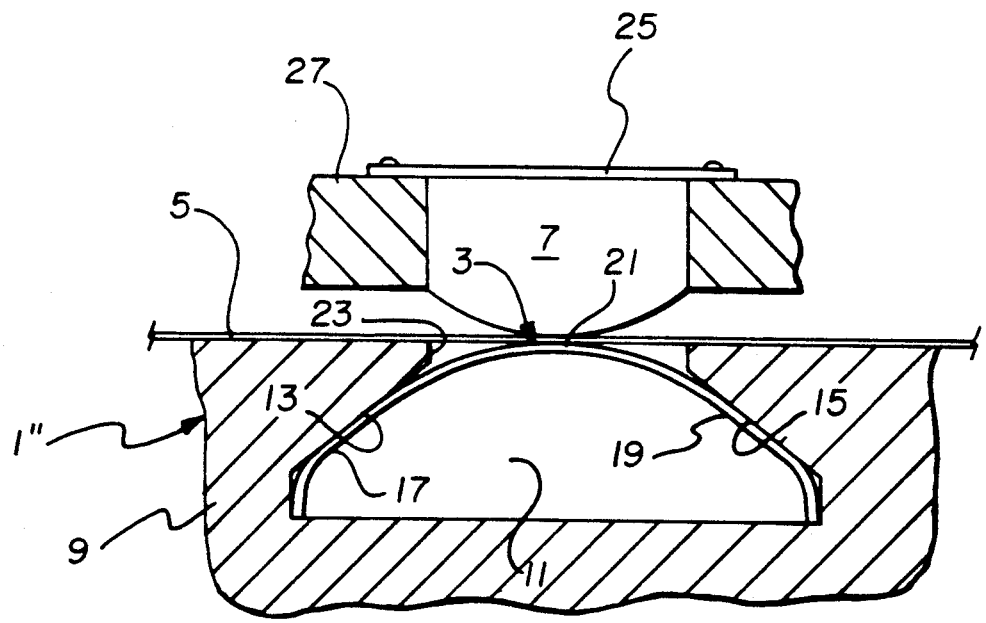
FIG. 6 is an elevation view similar to FIG. 2 but of the second alternate embodiment of the invention, showing the backer member in the deformed working state.

FIG. 5 shows a second alternate backer device 1" in the same state as the preferred backer device 1 is shown in FIG. 1, and FIG. 6 shows the second alternate backer device in the same state as the preferred backer device is shown in FIG. 2. In FIGS. 5 and 6, the reference numbers 3, 5, 7, 9, 11, 13, 15, 17, 19, 21, 23, 25, and 27 indicate elements corresponding to those shown in FIGS. 1 and 2 with like numbers.

The invention is shown and described with reference to preferred and alternate embodiments. However, it will be appreciated that variations and modifications can be made within the ordinary skill in the art without departing from the scope of the invention.

I claim:

1. A magnetic head-to-media backer device comprising an elastically deformable reed-shaped backer member adapted to urge a flexible magnetic media into contact with a magnetic head, is characterized in that:

a rigid frame has a cavity defined at least by a pair of opposite side walls shaped to bend said backer member into an arc with two opposite leg portions of the backer member captured within said cavity partly spaced from said opposite side walls to permit said leg portions to be deformed away from each other until they are constrained against said opposite side walls, and a center portion of the backer member protruding from an opening to the cavity to permit it to be depressed at least part way into said opening to deform said leg portions substantially against the opposite side walls, whereby when a magnetic head is forced against said center portion the center portion can be depressed into said opening at least until said leg portions are deformed against said opposite walls.

2. A magnetic head-to-media backer device as recited in claim 1, wherein said opposite side walls have respective concavities spaced from said leg portions that guide said leg portions away from each other until they substantially conform with said concavities when said center portion is depressed at least part way into said opening.

3. A magnetic head-to-media backer device as recited in claim 1, wherein said rigid frame includes a support upstanding in said cavity between said leg portions and spaced from said center portion to support the center portion only when it is depressed at least part way into said opening.

4. A magnetic head-to-media backer device comprising an elastically deformable reed-shaped backer member adapted to urge a flexible magnetic media into contact with a magnetic head, is characterized in that:

a rigid frame has a cavity defined at least by a pair of opposite side walls shaped to bend said backer member into an arc with two opposite leg portions of the backer member captured within said cavity partly spaced from said opposite side walls to make room for said leg portions to be deformed toward respective ones of said opposite walls, and a center portion of the backer member protruding from an opening to the cavity to permit it to be depressed at least part way into said opening to deform the leg portions toward the opposite walls, whereby when a magnetic head is forced against said center portion the center portion can be depressed into said opening at least until said leg portions are deformed toward said opposite walls.

5. A magnetic head-to-media backer device comprising an elastically deformable reed-shaped backer member adapted to urge a flexible magnetic media into contact with a magnetic head, is characterized in that:

a rigid frame has a cavity shaped to bend said backer member into an arc with two opposite leg portions of the backer member captured within said cavity and a center portion of the backer member protruding from an opening to the cavity, and it includes a support for said center portion upstanding in said cavity between said leg portions and spaced from the portion beneath the center portion, whereby when a magnetic head is forced against said center portion the center portion can be deformed into said opening against said support.

6. A magnetic head-to-media backer device as recited in claim 5, wherein said support has a flat surface facing said center portion.

* * * * *